United States Patent Office.

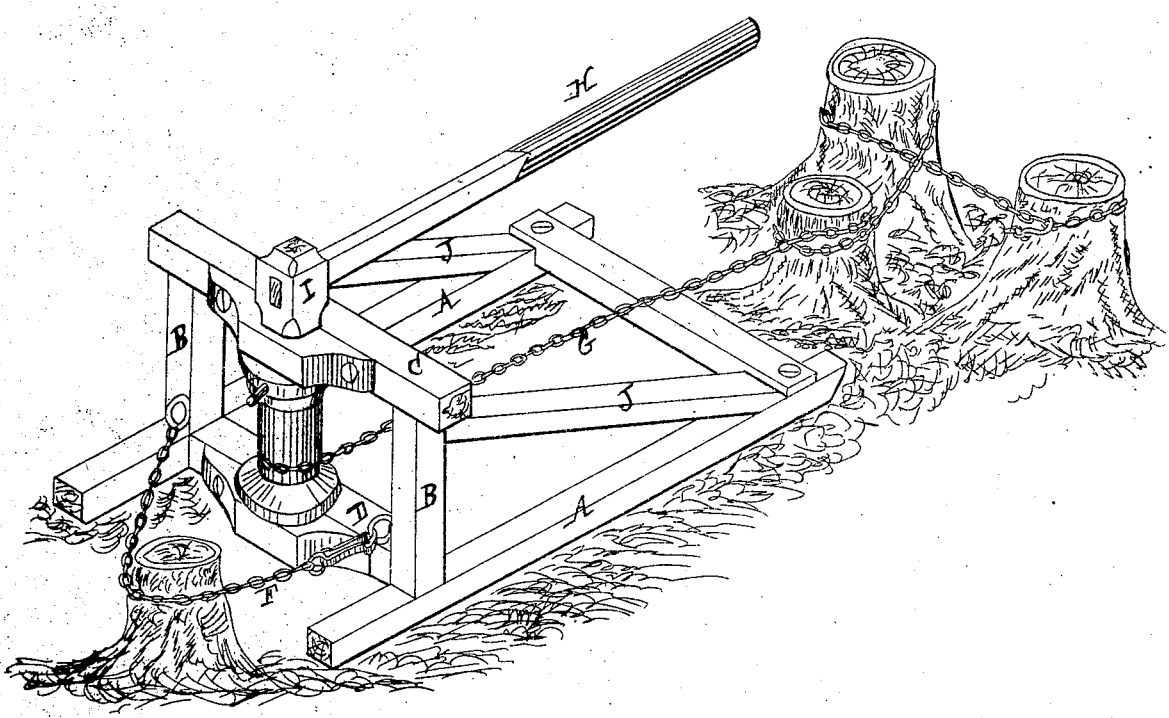

DANIEL I. HALL, OF DOWAGIAC, MICHIGAN.

Letters Patent No. 71,608, dated December 3, 1867.

---

IMPROVEMENT IN GRUBBING-MACHINE.

---

The Schedule referred to in these Letters Patent and making part of the same.

---

TO ALL WHOM IT MAY CONCERN:

Be it known that I, DANIEL I. HALL, of Dowagiac, in the county of Cass, and in the State of Michigan, have invented certain new and useful Improvements in Grubbing-Machines; and do hereby declare that the following is a full, clear, and exact description thereof, reference being had to the accompanying drawings, and to the letters of reference marked thereon.

In the annexed drawings, making part of this specification, A represents a frame, which is made of wood, and in a very solid and substantial manner, and which is intended to lie upon the ground. B B represent two uprights, which are erected upon this frame, and which are connected together by means of a cross-piece, C, which is framed into them at their upper ends. These uprights are braced from the frame, in one direction, by means of the braces J J. I represents a vertical shaft, which has a bearing in a cross-piece, D, of the frame A, and one in the cross-piece C at the top of the uprights B B. Around the shaft I is placed a spool, E, said spool being firmly connected to the shaft. To the upper end of shaft I is a lever, H, by means of which it is revolved. F represents a chain, which is connected at each end to the uprights B B, near their lower ends, and which is intended to be passed over or secured to the stump to be extracted. G represents a chain, one end of which is secured to the spool E, and the other end carried and wrapped around such stumps as may be in the immediate vicinity of the frame, as is clearly shown in the drawings.

When the chain F has been secured around the stump or grub to be pulled up, and the chain G has been secured to such stumps as are near, power is applied to the lever H, and the chain G is wound around the spool E, drawing the frame and spool away from toward the stump which the machine is pulling, carrying said stump with it. This machine may be used with either stumps or trees for drawing up stumps.

Having thus fully described my invention, what I claim as new, and desire to secure by Letters Patent, is—

The frame A, the uprights B B, cross-piece C, and the shaft I, with its spool and lever-handle, with the chains F and G, arranged and used as and for the purpose set forth.

In testimony that I claim the foregoing, I have hereunto set my hand, this 1st day of June, 1867.

DANIEL I. HALL.

Witnesses:
SOLOMON M. HOUZER,
GEORGE MILLER.